US009792530B1

(12) United States Patent
Wu et al.

(10) Patent No.: US 9,792,530 B1
(45) Date of Patent: Oct. 17, 2017

(54) GENERATING AND USING A KNOWLEDGE BASE FOR IMAGE CLASSIFICATION

(71) Applicant: Amazon Technologies, Inc., Seattle, WA (US)

(72) Inventors: Weixin Wu, Seattle, WA (US); Wei Xia, Seattle, WA (US); Meng Wang, Seattle, WA (US); Ranju Das, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/980,898

(22) Filed: Dec. 28, 2015

(51) Int. Cl.
*G06K 9/62* (2006.01)
*G06N 3/08* (2006.01)
*G06N 3/04* (2006.01)
*G06K 9/46* (2006.01)

(52) U.S. Cl.
CPC .......... *G06K 9/6253* (2013.01); *G06K 9/46* (2013.01); *G06K 9/6267* (2013.01); *G06N 3/0427* (2013.01); *G06N 3/08* (2013.01)

(58) Field of Classification Search
CPC .................................................. G06K 9/6253
See application file for complete search history.

(56) References Cited

U.S. PATENT DOCUMENTS

| 2006/0074832 A1* | 4/2006 | Gardner | G06N 5/02 706/45 |
| 2011/0282878 A1* | 11/2011 | Bird | G06F 17/30737 707/740 |
| 2016/0364419 A1* | 12/2016 | Stanton | G06F 17/3002 |

OTHER PUBLICATIONS

Deng et al, "Imagenet: A large-scale hierarchical image database," 2009, Computer Vision and Pattern Recognition, CVPR 2009, IEEE Conference on, pp. 1-8.*

(Continued)

*Primary Examiner* — David F Dunphy
(74) *Attorney, Agent, or Firm* — Lee & Hayes, PLLC

(57) ABSTRACT

A knowledge base (KB) is generated and used to classify images. The knowledge base includes a number subcategories of a specified category. Instead of obtaining images just based on a category name, structured and unstructured data sources are used to identify subcategories of the category. Subcategories that are determined to not be relevant to the category may be removed. The remaining data may be used to generate the KB. After identifying the relevant subcategories, representative images are obtained from one or more image sources based on the subcategories identified by the KB. The obtained images and the KB are then used to train an image classifier, such as a neural network or some other machine learning mechanism. After training, the neural network might, for example, classify an object within an image of a car, as a car, but also as a particular brand and model type.

20 Claims, 9 Drawing Sheets

(56) References Cited

OTHER PUBLICATIONS

Krizhevsky et al, "Imagenet classification with deep convolutional neural networks," 2012, Advances in neural information processing systems, pp. 1-9.*

Abdollahpour et al, "Image Classification Using Ontology Based Improved Visual Words", 2015, 23rd Iranian Conference on Electrical Engineering (ICEE), pp. 694-698.*

Gupta et al, "Deep Transfer Learning with Ontology for Image Classification", Dec. 19, 2015, Computer Vision, Pattern Recognition, Image Processing and Graphics (NCVPRIPG), 2015 Fifth National Conference on, 4 pages.*

Reshma et al, "Ontology based Classification for Multi-label Image Annotation", 2014, International Conference of Advanced Informatics: Concept, Theory and Application (ICAICTA), pp. 226-231.*

\* cited by examiner

GENERATING AND USING A KNOWLEDGE BASE FOR IMAGE CLASSIFICATION

BACKGROUND

While smartphones have revolutionized the taking of images, in both content and quantity, the way those images are managed and organized has hardly kept pace. Users have collected thousands of moments and memories, yet these images are typically just saved to random, disorganized "albums" on smartphones, on social media or in cloud storage. This scattered and disorganized system has made it difficult to find and look back at old images.

While there are different techniques that may be used to classify images, image classification remains difficult in machine learning. Many times these techniques may not perform well classifying subcategories within a particular category. For example, while a classification system may recognize an object within an image as a "car", the classification system may not recognize other information about the car, such as the brand of car, the year of the car, the style of the car, and the like.

DETAILED DESCRIPTION

Figure 1:
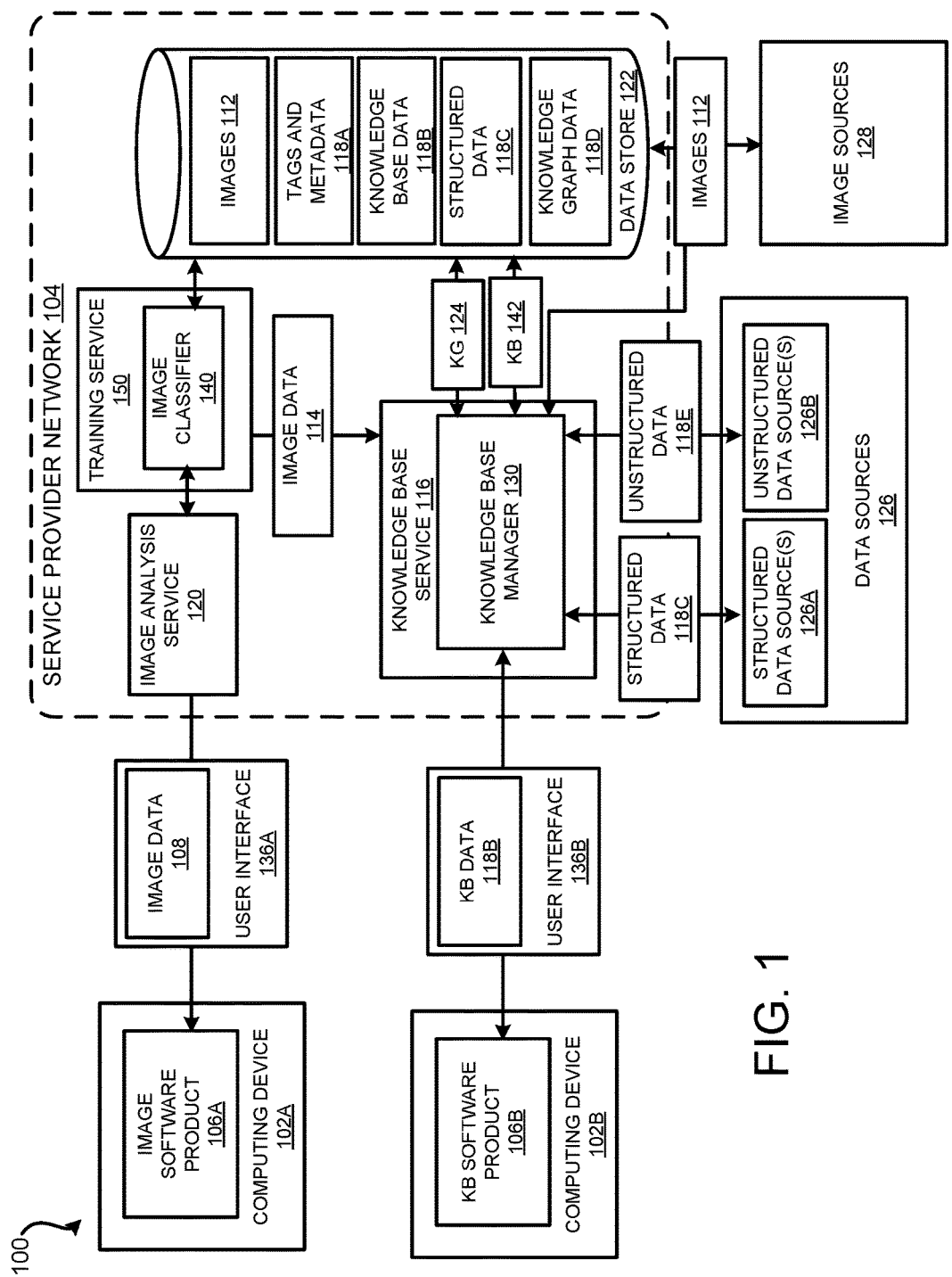
FIG. 1 is a computing system architecture depicting an illustrative operating environment in which a knowledge base is generated and used for image classification.

The following detailed description is directed to technologies for generating and using a knowledge base for image classification. The knowledge base (KB) can identify many different subcategories of a specified category (e.g., a "large-scale KB"). A large-scale KB can include, for example, a larger number of subcategories for a category as compared to a KB that includes only one or two subcategories for a category. Using techniques described herein, the KB can be generated and used to train an image classifier. For example, the image classifier can be configured to identify different categories and subcategories of the different categories. As an example, the image classifier can be trained using the KB, and images obtained using the KB, to identify a "car" category that includes subcategories for different car brands, the different car models for each of the car brands, and the different styles of cars that are part of particular car mode. In this way, the image classifier may provide a classification of an object at the subcategory level instead of just classifying the object at a category level (e.g., each car image is classified as "car" regardless of the car brand).

According to some configurations, structured and/or unstructured data sources are initially accessed to identify subcategories for a specified category. Generally, structured data stored in a structured data source includes data that is organized and follows a particular organized structure. Structured data is usually easily entered, stored, queried and analyzed. For instance, in many cases structured data can be included in a relational database in a simple, straightforward manner.

Unstructured data, on the other hand, is not organized according to a particular organizational structure. As an example of identifying subcategories of a dog, the PETFINDER.COM data source may be accessed to identify different dog breeds. Other data sources may also be accessed to identify possible subcategories to associate with the KB. For example, an internet search can be performed that obtains possible data sources for identifying subcategories for the specified category. In many cases, accessing one or more structured or unstructured data sources to identify subcategories for a specified category may identify a large number of subcategories of a specified category.

After identifying subcategories for a specified category, the KB can be generated to include the identified subcategories. In some configurations, a parser may be used to select, filter, add, or limit the subcategories that are associated with a specified category. For example, a user, or some computing device, may identify and remove a subcategory that is not particularly relevant to the specified category. As an example, the user may remove the identified subcategory of "wheel" from the "car" category. In some cases, subcategories that represent different meanings for the same word may be removed (e.g., limit the understanding of jaguar to "car" instead of to both "animal" and "car"). The parser may also be used to normalize the related words for the particular sense(s) selected. For example, the parser may modify (e.g., remove, add, edit) the related words received from the data source such that the words include the desired classes for objects identified within images. In some configurations, the parser modifies the subcategories to match existing tags that are used to identify objects within digital images. The subcategories that are determined to not be relevant can be removed from the KB.

After generating the KB, one or more image sources are accessed to obtain representative images for the subcategories and the category identified by the KB. In some examples, the data sources from which the subcategories are identified can be used to obtain representative images for the identified subcategories. In other examples, one or more additional image sources may be accessed to obtain representative images. According to some configurations, the image sources accessed depend upon the specified category. For example, when the category is "dogs", the STANFORD DOGS dataset may be accessed that includes approximately 21,000 images of 120 different dog breeds that are tagged based on the dog breed. Other datasets for dogs may also be accessed. For example, the PETFINDER.COM internet website can be accessed to locate images of different animals. In other examples, a web search may be performed to retrieve images for an identified category or subcategory. In other instances, a web search can be performed on each of the subcategories to obtain representative images from different web domains.

After obtaining the images, the images may be tagged with the name of the subcategory and/or category to which the image applies. For example, a user may initially tag the images. In some examples, the obtained images may already be tagged. The tagged images are associated with the KB. As discussed, the KB includes one or more images for each of the subcategories.

In some examples, the obtained images and the KB are used to train a machine learning classifier, such as an image classifier (e.g., a neural network) that is designed to classify objects identified within images. Training a neural network, or other types of machine learning mechanisms, to classify images includes many different steps. Generally, training a neural network, or other types of machine learning mechanisms, using images that include too many features or not representative features can cause the neural network to produce results that are not acceptable. For example, the neural network may identify a "wheel" as a "car". In some examples, a user removes the images that are not good representation for a particular category. For example, for the specified category of "cars", images that include just the wheel of a car can be removed. In other examples, a weight of one or more nodes in the neural network might be adjusted to not factor a particular feature as highly as another feature.

After training the image classifier using the KB, the image classifier may be used by an image analysis service to identify objects within images and tag the images with the appropriate subcategories and categories. Additional details regarding the various components and processes described above generating and using a knowledge base for image classification will be presented below with regard to FIGS. 1-9.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

FIG. 1 is a block diagram depicting an illustrative operating environment 100 in which a large-scale knowledge base is generated and used for image classification. As illustrated in FIG. 1, the operating environment 100 includes one or more computing devices 102 in communication with a service provider network 104 or some other distributed computing network.

A user may interact with the service provider network 104 using a computing device, such as the computing device 102. The computing device 102 may be computer, such as a desktop or a mobile computing device (e.g., a tablet or smartphone computing device). In some configurations, the computing device 102 may be connected to a television or some other display device. For instance, the computing device may be a dongle device that connects to a port of a television.

According to some examples, an application, such as an image software product 106A executing on the computing device 102A, or the KB software product 106B executing on the computing device 102B communicates with the service provider network 104. As used herein, the term "software product" may refer to software and/or software services. For example, a software product may be an application, a machine image, or software as a service ("SaaS"). The software product may be available from an electronic marketplace and may be executed on a customer computing device and/or within a service provider network or some other network.

In other examples, the image software product 106 may be executed within the service provider network (not shown) on behalf of the user. For example, the software products 106A-106B, or some other software product 106, may be executed on computing resources provided by the service provider network 104. The user of a computing device 102 may be a customer of the service provider network. As used herein, the terms "customer" and "customers" refer to existing customers of the service provider network 104 as well as visitors (i.e. potential customers) of the service provider network 104.

As described in more detail below, the service provider network 104 may include a collection of rapidly provisioned and, potentially, released computing resources hosted in connection with the electronic marketplace or a third party provider. The computing resources may include a number of computing, networking and storage devices in communication with one another. In some examples, the computing resources may correspond to physical computing devices. In other examples, the computing resources may correspond to virtual machine instances implemented by one or more physical computing devices. In still other examples, computing resources may correspond to both virtual machine instances and physical computing devices.

As illustrated, the service provider network 104 includes a knowledge base service 116, an image analysis service 120, a training service 150, and a data store 122A. While the knowledge base service 116, the image analysis service 120, the training service 150, and the data store 122 are illustrated within the service provider network 104, one or more of these services and data store may be located in other locations. For example, some or all of the functionality of the knowledge base service 116 and/or the image analysis service 120 may be performed on the computing device 102A, the computing device 102B, and/or on some other computing device.

In some examples, an image software product 106 provides functionality for users to view images 112 that are tagged according to objects identified within the images 112. For example, an image of a BMW car may include many tags identified by the image analysis service 120 such as a "car" tag, a "BMW" tag to indicate that the car is a BMW, a "5 Series" tag to indicate that the BMW is a 5 Series, a "535" tag to indicate that the BMW depicted in the image is a 535 model BMW. As will be described in more detail below, many other tags may be associated with an image 112. In order to classify objects within an image, the image analysis service can utilize an image classifier 140. In some examples, the image classifier 140 can be a neural network or some other machine learning mechanism. In order to obtain results that are acceptable to a user, the image classifier 140 should be trained using many different images that are representative of the category and subcategories desired to be classified.

As discussed herein, techniques are provided to generate an extensive large-scale KB 142 that can be used to train the image classifier 140 to not only recognize a broad category, but also many subcategories of the category. As an example, the image classifier 140 can be trained using the KB 142 to identify a "car" category that includes subcategories for the different car brands, the different car models for each of the car brands, and the different styles of cars that are part of particular car mode. As another example, the image classifier 140 can be trained using the KB 142 to identify a "dog" category that includes subcategories for different breeds of dogs that can include subcategories for puppies and adult dogs. In this way, the image classifier 140 may provide a classification of an object at the subcategory level instead of just classifying the object at a category level (e.g., each car image is classified as "car" regardless of the car brand).

According to some configurations, one or more data sources 126 are accessed to identify subcategories associated with a specified category. For example, instead of just locating and obtaining images for a particular category, a search for the subcategories associated with the specified category are identified. In some configurations, a structured data source 126A (e.g., FREEBASE, DBPEDIA, BABELNET or some other web based structured data source), is initially accessed to identify subcategories for a specified category. For example, one or more structured data sources 126A that includes data about automobiles (e.g., TRUECAR.COM, AUTOEVOLUTION.COM), is accessed by the knowledge base manager 130 to obtain structured data 118C that may be parsed to identify the subcategories for the specified category of "car". In addition, or alternatively, an unstructured data source 126B can be accessed by the knowledge base manager 130 to identify subcategories of the specified category. For example, an internet search can be performed by the knowledge base manager 130, or some user, that obtains unstructured data 118A that can be parsed to identify subcategories for the specified category. In many cases, accessing one or more structured data sources 126A or the unstructured data sources 126B to identify subcategories for a specified category may identify a large number of subcategories of a specified category.

After identifying subcategories for a specified category, the knowledge base manager 130, or some other computing device or component, may generate the KB 142. As described herein, the KB 142 identifies subcategories for one or more specified categories. In some examples, the knowledge base manager 130 may be used to select, filter, add, or limit the subcategories that are identified as being associated with a specified category. In many cases, the data sources 126 may include some data that is not relevant to the specified category. In some examples, a user may identify and remove a subcategory that is not particularly relevant to the specified category. According to some configurations, the knowledge base manager 130 provides KB data 118B to the KB software product 106B for presentation within the user interface 136B such that the user may add, remove, or edit the subcategories identified from the data sources 126. As an example, the user via user interface 136B may remove the identified subcategory of "wheel" from the "car" category.

In some cases, subcategories that represent different meanings for the same word may be removed (e.g., limit the understanding of jaguar to "car" instead of to both "animal" and "car") and not included in the KB 142. The knowledge base manager 130 may also be used to normalize the related words for the particular sense(s) selected. For example, the parser may modify (e.g., remove, add, edit) the related words received from the data source such that the words include the desired classes for objects identified within images. In some configurations, the parser modifies the subcategories to match existing tags that are used to identify objects within digital images. In other examples, a user (e.g., using the KB software product 106B) may specify one or more subcategories to remove from the KB 142.

After specifying the relevant subcategories within the KB 142, one or more image sources 128 are accessed by the knowledge base service 116 and/or a user to obtain representative images for the subcategories and the category. In some examples, the same data sources 126 (structured or unstructured) may be used to obtain representative images for the identified subcategories. In other examples, one or more additional image sources 128 may be accessed by the knowledge base service 116 or some other computing device or component to obtain representative images.

According to some configurations, the image sources 128 accessed depend upon the specified category. For example, when the category is "dogs", the STANFORD DOGS dataset may be accessed that includes about 21,000 images of 120 different dog breeds that are tagged based on the dog breed. Other datasets for dogs may also be accessed. For example, a website, such as PETFINDER.COM, can be accessed to locate images of different animals. In other examples, a web search may be performed to retrieve images for an identified category or subcategory. In other instances, a web search can be performed by a user, or the knowledge base manager 130 may programmatically perform one or more searches to retrieve data for each of the subcategories that may be utilized to obtain representative images from different web domains.

After obtaining the images 112 that are representative of the category and the subcategories, the images can be tagged with the name of the subcategory and/or category to which the image applies. For example, a user may initially tag each of the images. The tagged images are associated with the KB 142. As discussed, the KB 142 can include one or more images for each of the subcategories. In cases where an image 112 for a particular subcategory is not received, a crowd sourcing request may be utilized to obtain a representative image. For example, the knowledge base manager 130 may place a request, on one or more websites or send a message to users of the image software product 102A, for representative images 112 for a particular subcategory.

In some examples, the KB 142, along with the obtained images 112, are used to train an image classifier 140, such as a neural network that is designed to classify objects identified within images 112. Generally, a neural network consists of layers of nodes, including hidden layers. Each hidden layer in the neural network includes nodes linked to other nodes using incoming and outgoing connections. In some examples, each of the connections can have a different adjustable weight. Passing data through these hidden layers results in an output of the neural network. A feature of neural networks is the iterative learning process in which data are presented to the network and the weights associated with the input values are adjusted each time. After the training data are presented, another training iteration may start over again. During this learning phase for the neural network, the neural network learns by adjusting the weights so as to be able to predict the correct class label of input samples According to some examples, after image data is passed through the layers of the neural network during a forward propagation-training step, objects (e.g., individuals, other physical objects) within the image 112 are classified by the neural network into different classifications, such as the tags discussed herein. The knowledge base manager 130, and/or some other computing device or component (e.g., the training service 150) may use the KB 142 to assist in identifying whether an image 112 was correctly identified. For example, do the objects in the image match one or more of the subcategories defined by the KB 142.

When an object is not properly identified during the supervised training of the neural network, this information may be used during the back-propagation training phase of the image classifier 140. Backpropagation is a technique to minimize errors within the neural network. The knowledge base manager 130, the training service 150, or some other computing device or component can adjust one or more of the weights within the neural network. Generally, the backward propagation training phase of the neural network is a supervised learning technique that adjusts the weights of different nodes within the network to produce a desired result (e.g., the correct classification of an object within the image 112). During the backward propagation training phase, the desired outputs for the neural network (the correct classification) are compared at the outputs produced by the output layer of the neural network. The difference between the output of the final layer of the neural network and the desired output is back-propagated to the previous layer(s), usually modified by the derivative of the transfer function, and the connection weights are normally adjusted according to a delta rule. The delta rule can be a gradient descent learning rule for updating the weights of the inputs to artificial neurons in a neural network. This process proceeds for the previous layer(s) until the input layer is reached.

Training a neural network, or other types of machine learning mechanisms, to classify images includes many different steps. In some examples, a publicly available machine learning library may be utilized, such as TORCH7, THEANO/PYLEARN, CAFFE, and the like. One of the first steps is generating a training set, such as using the KB 142 to obtain representative images. As can be appreciated from the above discussion, images from the different images sources can come in many different formats. In some configurations, the data used to train the neural network is image data obtained from the images 112. According to some examples, a manual analysis of the images 112 may be performed to remove images that are not good representations of a particular category. Generally, training a neural network using images that include too many features or not representative features can cause the image classifier 140, such as a neural network, to produce results that are not acceptable. For example, the neural network may identify a "wheel" as a "car". In other examples, training a neural network on a dataset with too many categories or features can cause the neural network to become confused and produce subpar results. Therefore, in some examples, the training data set includes representative images for one or more subcategories identified in the KB 142.

Training the neural network can also include setting various parameter, including, but not limited to hidden units, learning rate, momentum, weight, maximum norm, batch size, maximum tries, maximum iterations, and the like. The hidden units identifies the number of nodes in the hidden layer. The learning rate determines the learning rate for the neural network. Setting a smaller learning rate results in the neural network learning in finer increments, but generally increases the time required to train the neural network. The momentum adds part of the previous weight to the current weight. This is done to try to prevent the neural network from settling on a local minimum when training. A high momentum can result in the neural network being trained more quickly, but can also end up overshooting the minimum. The maximum norm is used to determine how much to update the neuron weights within the neural network. The batch size specifies the size of the training example. The maximum tries determines when to stop the training process early, if after a certain amount of tries, error has not decreased. The maximum iterations determines the maximum amount of times to iterate overall.

In some examples, a user removes the images 112 that are not an accurate representation of a particular category. For instance, for a specified category of "car", images 112 that include just the wheel of a car can be removed. In other examples, a weight of one or more nodes in the neural network might be adjusted to factor a particular feature more highly than another feature. In some configurations, a user may adjust the weights of nodes within the neural network during training. After training the image classifier using the large-scale KB 142, the image classifier 140 may be used by an image analysis service to identify objects within images and tag the images with the appropriate subcategories and categories.

Figure 4:
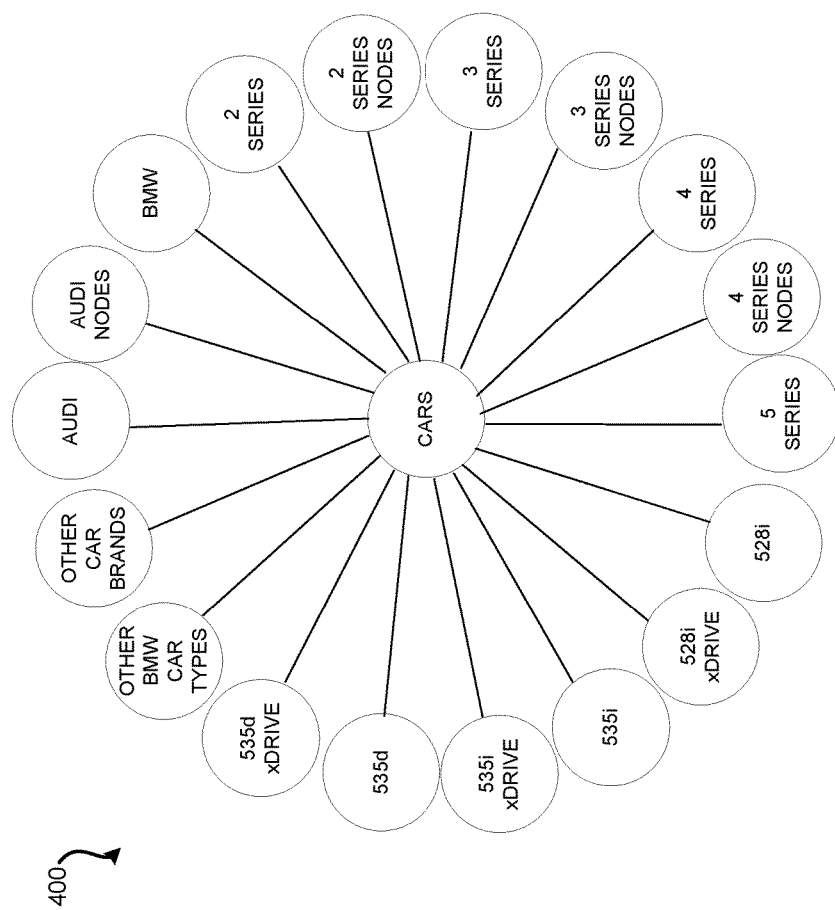
FIG. 4 is a block diagram showing an illustrative flattened graph including subcategories directly connected to the category node.

According to some configurations, the knowledge base service 116 generates a knowledge graph (KG) using the KB 142, such as the KG illustrated in FIG. 4. Generally, the KG 124 may be constructed using the identified subcategories for the specified category and includes the category directly connected to the subcategories. The image analysis service 120 can use the KG 142 in conjunction with the tags and metadata 118A for the images 112 of a user when identifying the objects and concepts within an image. In many cases, the tags for an image 112 may be very close together in meaning. For example, a dog may be classified as an animal, a carnivore, a vertebrate, a mammal and the like. By creating the KG 124 to represent a classification for a dog that includes the identified subcategories, the different meanings or words used to classify a dog may be associated with direct connections. In this way, the concepts within an image might be more easily identified as compared to having similar tags that are not associated In some configurations, the knowledge base service 116, or some other component or device, can generate a GUI 136B that includes user interface ("UI") elements used during the generation of the KB 142. For instance, the GUI 136B might include one or more user interface elements that allow a user to remove, add or edit identified subcategories, add or remove a representative image, tag the representative images, select a node in KG 124 for editing, adjust a weight of a node in a neural network, and the like. In some examples, the knowledge base manager 130 provides the GUI 136B for presentation in the user interface 136B.

According to some configurations, the image analysis service 120 analyzes the images 112 that are associated with a particular user using the image classifier 140 trained by the training service 150. For example, the images 112 may be digital images that were taken by the user and/or shared with the user. In some examples, the images 112 for a user may be obtained in other ways. For example, from some other image source. In other configurations, the analysis of the images 112 may be performed on some other computing device, such as the computing device 102. The images 112 of a user may be stored on a data store (not shown) of a user computing device 102, the data store 122 within the service provider network 104, and/or on some other image source, such as image sources 128. For example, the image sources 128 may be a social media service (e.g., Facebook) or some other data store (e.g., Dropbox). In some examples, the images 112 may be obtained from video of the user (e.g., taken by a smartphone or camera of the user).

A digital image, such as one of the images 112, often includes a set of metadata (meaning data about the image). For example, a digital image 112 may include, but is not limited to, the following metadata: title; subject; authors; date acquired; copyright; creation time—time and date when the image is taken; focal length (e.g., 4 mm); 35 mm focal length (e.g., 33); dimensions of the image; horizontal resolution; vertical resolution; bit depth (e.g., 24); color representation (e.g., sRGB); camera model (e.g., iPhone 6); F-stop; exposure time; ISO speed; brightness; size (e.g., 2.08 MB); GPS (Global Positioning System) latitude (e.g., 42; 8; 3.00000000000426); GPS longitude (e.g., 87; 54; 8.999999999912); and GPS altitude (e.g., 198.36673773987206). The GPS latitude, longitude and altitude may also be referred to as a GeoTag that identifies the geographical location (or geolocation for short) of the camera that took the picture and usually the objects within the image when the image is taken. An image or video with a GeoTag is said to be geotagged. In a different implementation, the GeoTag is one of the tags embedded in the image by the image analysis service 120 and/or some other component or computing device.

The images 112 can also include one or more tags embedded in the image, or possibly stored separately from the image, as metadata. The tags describe and indicate the characteristics of the image. For example, a "family" tag indicates that the image is a family image, a "wedding" tag indicates that the image is a wedding image, a "subset" tag indicates that the image is a sunset scene image, a "Santa Monica beach" tag indicates that the image is a taken at Santa Monica beach, etc. In some examples, each recognized item within the image may include a tag. There may be thousands of different tags. In some cases, a user may modify and/or create tags. For example, user tags may be used to identify recognized individuals in the images 112, other tags may identify particular animals in the images 112, other tags may identify objects within the images (e.g., cars, buildings, tables, chairs).

In some examples, the image analysis service 120 can be configured to generate the tags from the images. In other examples, the image analysis service 120 extracts or retrieves the metadata and tags from each received or retrieved image. For example, a piece of software program code written in computer programming language C# can be used to read the metadata and tags from the images. In some configurations, the image analysis service 120 normalizes the tags of the retrieved images. For example, both "dusk" and "twilight" tags are changed to "sunset." The image analysis service 120 may also generate additional tags for each image. For example, a location tag is generated from the GeoTag in an image. In some examples, the image analysis service 120 sends the GPS coordinates within the GeoTag to a map service server requesting for a location corresponding to the GPS coordinates. For example, the location may be identifies as "Santa Monica Beach" or "O'Hare Airport." The name of the location is then regarded as a location tag for the image.

According to some configurations, the image analysis service 120 generates tags based on results of scene understanding and/or facial recognition that are performed on each image 112. For example, the image analysis service 120 may determine the scene type (such as beach, sunset, etc.) for each image 112 that is analyzed. The scene type determined by the image analysis service 120 may then be used as an additional tag (i.e., a scene tag) for the image 112. In some examples, the image creation time determined from the metadata associated with the image 112 may be used to assist scene understanding. For example, when the scene type is determined to be "beach" and the creation time is 6:00 PM for an image, both beach and sunset beach may be tags for the scene types of the image 112. As an additional example, a dusk scene image and a sunset scene image of a same location or structure may appear to be similar. In such a case, the image creation time helps to determine the scene type, i.e., a dusk scene or a sunset scene.

The date of the creation time and geolocation of the image may also be considered in determining the scene type. For example, the sun disappears out of sight from the sky at different times in different seasons of the year. Moreover, sunset times are different for different locations. Geolocation can further assist in scene understanding in other ways. For example, an image 112 of a big lake and an image 112 of a sea may look very similar. In such a case, the geolocations of the images may be used to distinguish a lake image from an ocean image.

The image analysis service 120 may also perform facial recognition to recognize faces and determine facial expressions of individuals within the images 112. In some examples, different facial images (such as smile, angry, etc.) are identified and used to create one or more emotion tags for the individual within the image. The image analysis service 120 may add one or more emotion tags (e.g., happy, sad, crying, laughing, smiling, frowning) to each image. For example, when the facial expression is smile for an image, the image analysis service 120 adds a "smile" tag to the image. The "smile" tag is a facial expression or emotion type tag.

The image analysis service 120 may also generate an event tag for special days and/or events. For example, when the creation time of the image is on a recognized holiday (e.g., July 4th or December 25$^{th}$), a "July 4th" tag or a "Christmas" tag may be generated by the image analysis service 120. The creation time might also be used to identify a special event for the user. For example, the event might be a birthday, a wedding, a graduation, or the like. In some configurations, the image analysis service 120 may access calendar data for the user (or other users recognized within the image 112) to determine whether that day is associated with an event identified by the user. In other examples, the image analysis service 120 may analyze the image 112 and determine that the image is associated with a particular event. For instance, the image analysis service 120 may recognize graduation hats and robes in the images 112 and determine that the image relates to a graduation. In this example, the image analysis service 120 may generate a "graduation" event tag.

In other configurations, the image analysis service 120 may receive tags entered and/or modified by a user. For example, the image analysis service 120 may provide a web page interface, such as user interface 136 that allows a user to tag an image by entering new tags and/or modify existing tags of the images 112. The tags associated with an image 112 may be stored within a data store, such as data store 122A and/or 122B. In other examples, the tags might be stored as part of the image file for the images 112.

According to some examples, the image analysis service 120 within the service provider network 104 may not have access to the images 112 of a user. For instance, the images 112 may be stored on the computing device 102. In this case, the image software product 106 might provide image data 108 to the image analysis service 120. The image data 108 might include metadata and tags for the images. In other cases, the image data 108 might be thumbnails for the images 112 that may be analyzed by the image analysis service 120. In yet other examples, the image data 108 might include other information about the images 112. In some configurations, the image analysis service 120 may maintain a unique identifier for each image that may be used to locate the metadata and tags of the corresponding image within the data store 122B, or some other location.

In some examples, the image analysis service 120 indexes the images using the generated tags and/or metadata. Furthermore, the images 112 may be categorized by scene types, such as a beach resort or a river. In some examples, the image analysis service 120 accesses social networking web page(s) of a user and analyzes the images 112 of the user that are included within the web pages(s).

For more details on generating tags and analyzing images, see applications, including U.S. patent application Ser. No. 14/074,575, entitled "SYSTEM AND METHOD FOR AUTOMATICALLY GENERATING ALBUMS" filed Nov. 7, 2013, U.S. patent application Ser. No. 14/074,594, entitled "SYSTEM, METHOD AND APPARATUS FOR SCENE RECOGNITION" filed Nov. 7, 2013, U.S. patent application Ser. No. 14/074,615, entitled "SYSTEM, METHOD AND APPARATUS FOR FACIAL RECOGNITION" filed Nov. 7, 2013, U.S. patent application Ser. No. 14/316,905, entitled "SYSTEM, METHOD AND APPARATUS FOR ORGANIZING PHOTOGRAPHS STORED ON A MOBILE COMPUTING DEVICE" filed Jun. 27, 2015, U.S. patent application Ser. No. 14/747,232, entitled "SYSTEM, METHOD AND APPARATUS FOR IMAGE SCENE RECOGNITION" filed Jun. 23, 2015, each of which is hereby incorporated by reference in its entirety, entitled "SYSTEM, METHOD AND APPARATUS FOR PERFORMING FACIAL RECOGNITION" filed Jun. 24, 2015, PCT Number PCT/US15/36637, entitled "SYSTEM, METHOD AND APPARATUS FOR ORGANIZING PHOTOGRAPHS STORED ON A MOBILE COMPUTING DEVICE" filed Jun. 19, 2015, U.S. Patent Application No. 61/724,628, entitled "SYSTEM, METHOD AND APPARATUS FOR SCENE RECOGNITION," filed Nov. 9, 2012, U.S. Patent Application No. 61/837,210, entitled "SYSTEM, METHOD AND APPARATUS FOR FACIAL RECOGNITION," filed Jun. 20, 2013, U.S. Patent Application No. 61/724,628, entitled "SYSTEM, METHOD AND APPARATUS FOR SCENE RECOGNITION," filed Nov. 9, 2012, U.S. Patent Application No. 61/837,210, entitled "SYSTEM, METHOD AND APPARATUS FOR FACIAL RECOGNITION," filed Jun. 20, 2013, each of which is hereby incorporated by reference in its entirety, which are commonly owned by AMAZON TECHNOLOGIES, INC.

Figure 2:
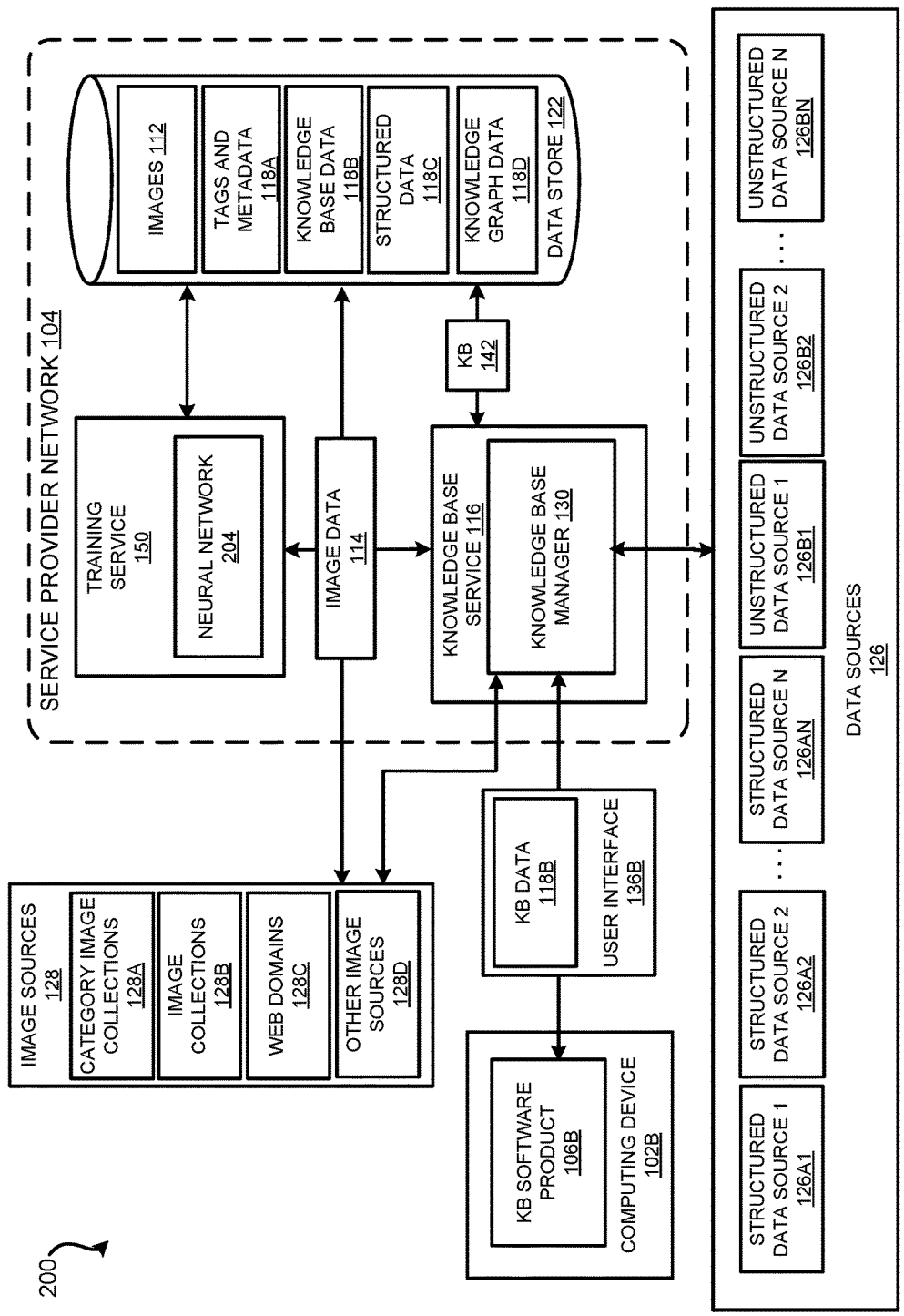
FIG. 2 is a computing system architecture depicting an illustrative operating environment in which a large-scale knowledge base is generated and used to train an image classifier for classifying images.

FIG. 2 is a computing system architecture depicting an illustrative operating environment 200 in which a large-scale knowledge base is generated and used to train an image analysis service for classifying images. The operative environment 200 includes many of the same components illustrated in the operative environment 100 of FIG. 1.

As illustrated, the service provider network 104 includes a knowledge base service 116, a training service 150, and a data store 122A. In the operating environment 200, the training service 150 includes a neural network 204. The service provider network 104 is coupled to the data sources 126 that include structured data sources 1-N (126A1-126AN) and unstructured data sources 1-N (126B1-126BN). The service provider network 104 is also coupled to the images sources 128 that include category image collections 128A, image collections 128B, and web domains 128C.

As discussed above, the data sources 126 that are accessed may include both structured data sources 126A and unstructured data sources and unstructured data sources 126B1. As an example, the structured data sources may be a structured database, a spreadsheet, a web domain that structures data, and the like. Generally, structured data refers to data that is organized and follows a particular structure. For instance, in many cases structured data can be included in a relational database in a simple, straightforward manner. Structured data is usually easily entered, stored, queried and analyzed.

Unstructured data, on the other hand, is not organized according to a particular structure. In some configurations, the knowledge base service 116 may programmatically identify, without little or no user intervention, categories and subcategories from data received from a structured data source 126A. According to some examples, the knowledge base manager 130 is configured to receive a search request from a user (e.g., from the user interface 136B) and perform the search using one or more search engines. The data returned from the searches is typically unstructured data. In contrast, in many instances, a user identifies categories and subcategories from unstructured data sources 126B.

As discussed above, after identifying the relevant subcategories for the specified category, the knowledge base service 116 can generate the KB 142. The knowledge base service 116 may then use the subcategories identified by the KB 142 to obtain representative images. For example, the knowledge base manager 130 can access the image sources 128 to obtain the representative images for the subcategories and the category. In some examples, the same data source 126 (structured or unstructured) may be used to obtain representative images for the identified subcategories. In other examples, one or more additional image sources 128 can be accessed by the knowledge base service 116 or some other computing device or component to obtain representative images. The image sources 128 can include many different images sources.

The images sources can be category image collections 128A that include representative images 112 of a particular category or subcategory, image collections 128B that are not limited to a particular category or subcategory, web domains 128C that may include representative images 112, as well as other image sources 128D. As an example, the category image collections 128A can include the image datasets CALTECH 101, CALTECH 256, 17 CATEGORY FLOWER CLASSIFICATION DATA SET, STANFORD DOGS, ANIMALS WITH ATTRIBUTES, CIFAR 10, and the like. The CALTECH 101 image dataset includes pictures of objects belonging to 101 categories. Each category includes about 40-80 images. The CALTECH 256 image dataset includes about 31,000 images belonging to 256 categories. The 17 CATEGORY FLOWER CLASSIFICATION DATA SET includes 17 categories of flowers common to the United Kingdom with 80 images for each class. The 102 CATEGORY FLOWER CLASSIFICATION DATA SET includes 102 categories of flowers with about 40-258 images for each class. The ANIMALS WITH ATRIBUTES data set includes 30475 images divided between 50 animal classes. The CIFAR-10 dataset consists of 60000 images in 10 classes, with 6000 images per class. The CIFAR-100 dataset consists of 60000 images in 100 classes, with 600 images per class. Many other image sources exist.

The image sources 128 can also be general image collections that are not organized. In some examples, the image collections 128B can be accessed at a particular network address (e.g., web domains 128C). In some configurations, one or more web domains 128C may be accessed to obtain representative images for the identified subcategories. For example, a web search may be performed programmatically by the knowledge base manager 130 and/or by a user to obtain representative images.

As discussed above, the image sources 128 accessed can depend upon the specified category. In some examples, a user may select one or more identified images sources 128 using the user interface 136B. For instance, a user using the KB software product 106B may select from predefined images sources that are associated with particular categories and/or enter other images sources 128D. The KB software product 106B can be configured to assist a user in refining the identified categories, obtaining the relevant images, and assisting in training the image classifier 140, such as the neural network 204. In some configurations, the KB software product 106B interacts with the knowledge base manager 130 when user input is requests. For instance, the knowledge base manager 130 may provide KB DATA 118B to the KB software product 106B for presentation within the user interface 136.

Figure 3:
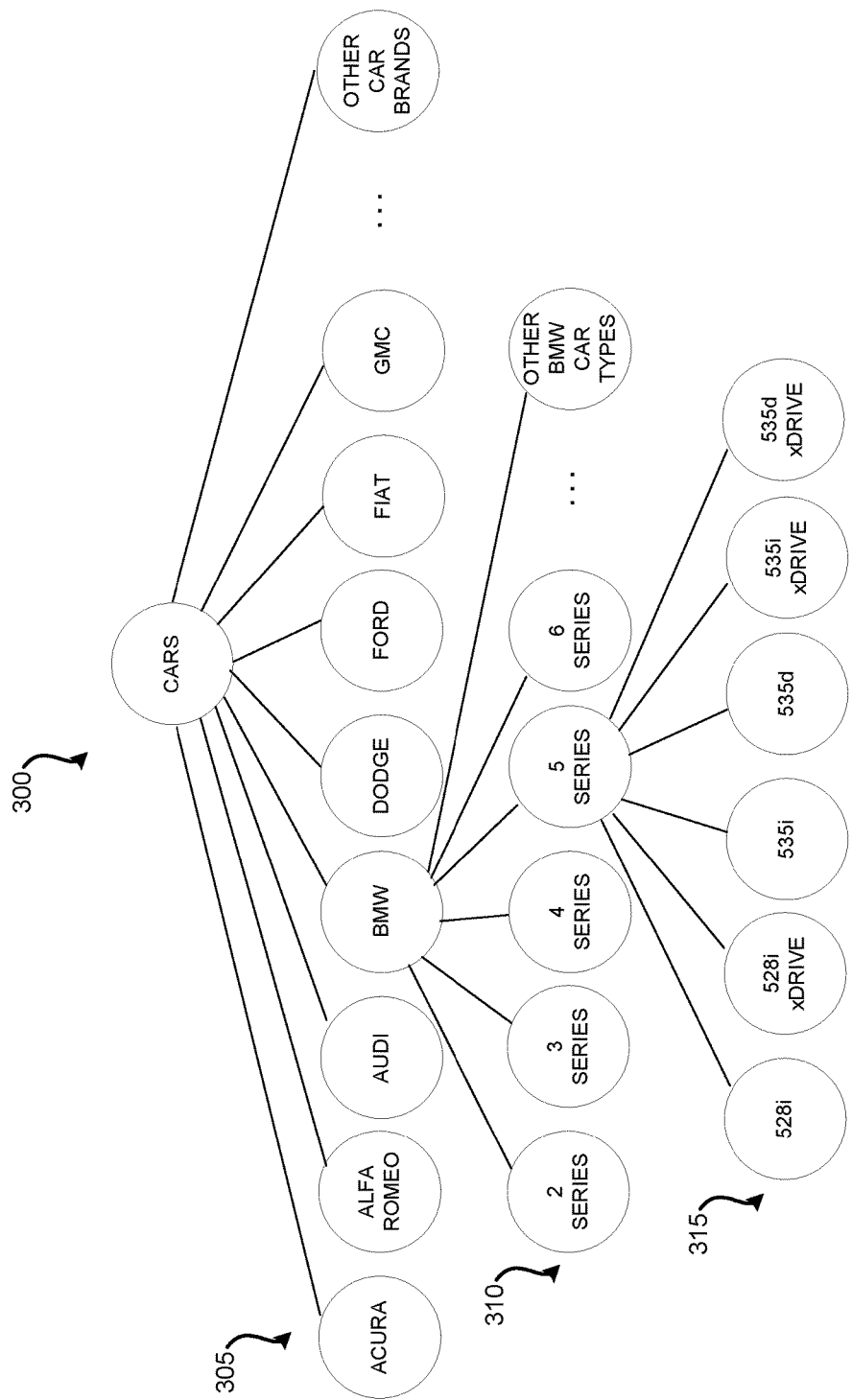
FIG. 3 is a block diagram showing an illustrative graph including subcategories identified using data from unstructured and/or structured data sources.

FIG. 3 is a block diagram showing an illustrative graph 300 including subcategories identified using data from unstructured and/or structured data sources. As illustrated, the graph 300 represents the category "cars" and includes subcategories identified from one or more data sources. As will be appreciated, similar graphs may be created for other specified categories. The knowledge base service 116 may generate the graph 300.

In the current example, the graph 300 includes a first hierarchical level 305, a second hierarchical level 310, and a third hierarchical level 315. The first hierarchical level 305 identifies different car brands that are subcategories of the specified category "cars". The second hierarchical level 310 identifies car makes under the car brand "BMW". The third hierarchical level 315 identifies the car models under the five series car make. In some examples, in order to obtain all the subcategories for the cars specified category, the knowledge base service 116 may programmatically follow the structured or unstructured data source to obtain more subcategories for the specified category.

FIG. 4 is a block diagram showing an illustrative flattened graph including subcategories directly connected to the category node. As illustrated, the graph 400 represents the category "cars" and includes subcategories directly connected to the parent node "cars". The knowledge base service 116 and/or the training service 150 may generate the flattened graph 400.

As illustrated, the graph 400 includes a cars node directly connected to each of the identified subcategories as illustrated in FIG. 3. As discussed above, instead of having a multi-hierarchical graph, the knowledge base service 116 and/or the training service 150 may flatten the graph 300 which may be referred to herein as a knowledge graph 124. In this way, a search may be performed that identifies more readily the subcategories and other similar words for the category that are direct connections.

Figure 5:
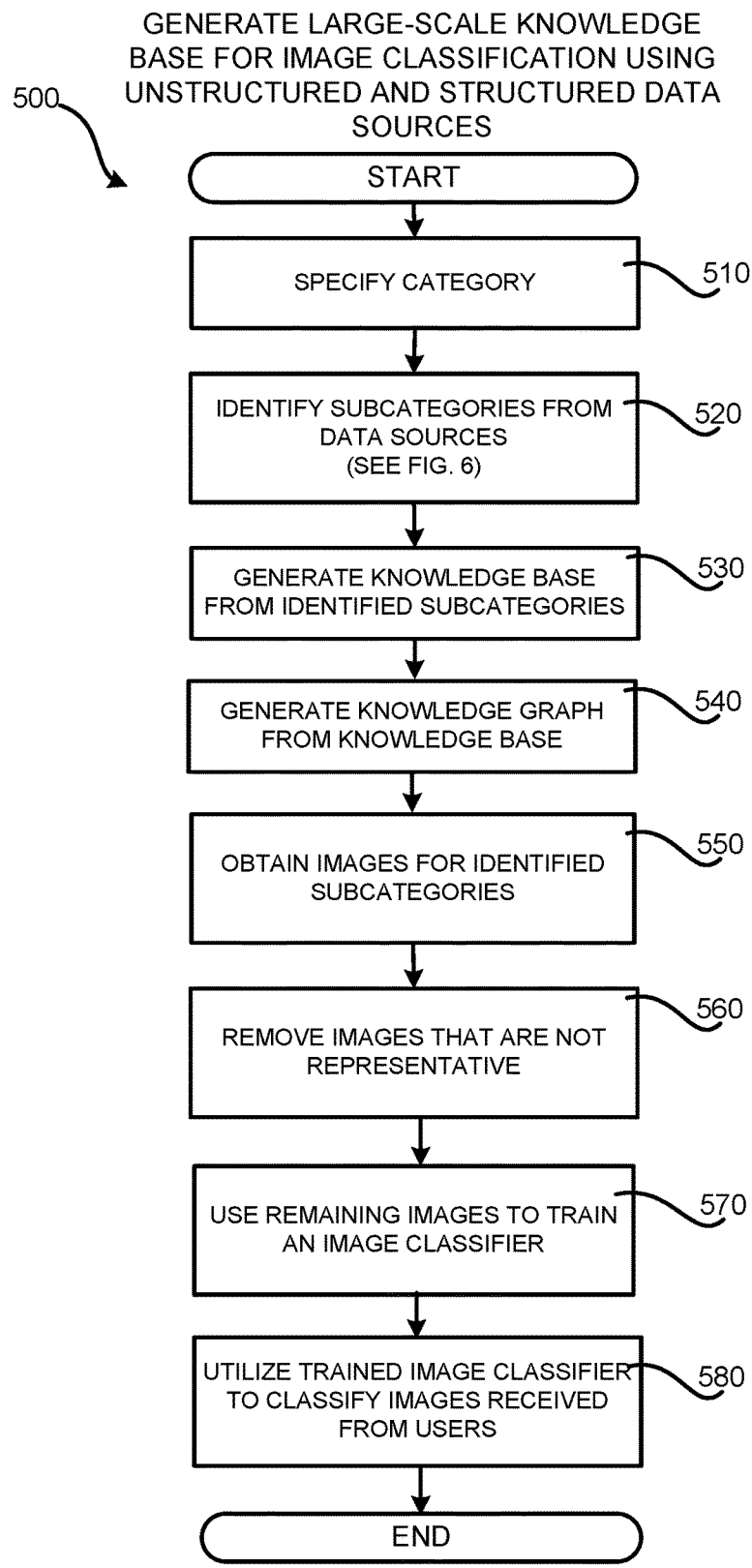
FIG. 5 is a flow diagram showing a routine illustrating aspects of a mechanism disclosed herein for generating and using a large-scale knowledge base for image classification.
Figure 6:
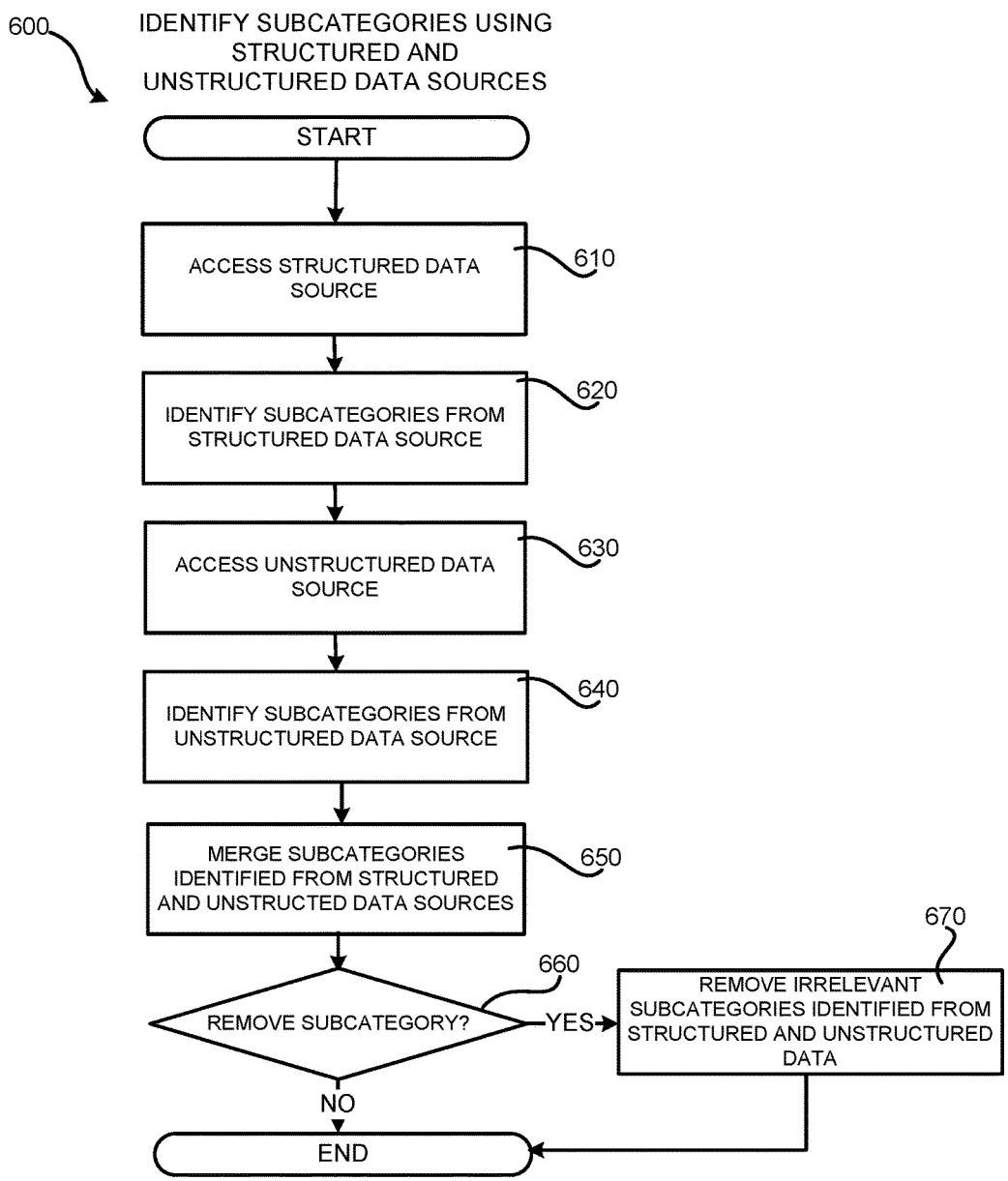
FIG. 6 is a flow diagram showing a routine illustrating aspects of a mechanism disclosed herein for identifying subcategories using structured and unstructured data sources.

FIGS. 5-6 are flow diagrams showing routines that illustrate aspects of a mechanism for generating and using a knowledge base for image classification. It should be appreciated that the logical operations described herein with respect to FIG. 4, FIG. 5, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 5 is a flow diagram showing a routine 500 illustrating aspects of a mechanism disclosed herein for generating and using a knowledge base for image classification. The routine 500 may begin at 510, where a subcategory is specified. As discussed above, a user, such as a developer of the image analysis service 120, the training service 150, or the developer of the image software product 106 may specify a category that is either not currently identified or that may not include many subcategories. For example, the image analysis service 120 may tag "cars" recognized in the images 112 but not include any subcategories. Similarly, a new category may be specified for the image analysis service 120 to recognize.

At 520, subcategories are identified from data sources 126. As discussed above, the KB service 116 may access unstructured and structured data sources 126. In some examples, the data sources 126 accessed depend upon the specified category. For example, some data sources 126 may not be relevant to some categories. More details on identifying subcategories is provided below with regard to FIG. 6.

At 530, a KB 142 can be generated from the identified subcategories. As discussed above, the KB 142 can be generated by the knowledge graph manager 130. In some examples, the KB 142 includes the different subcategories identified from the structured and unstructured data sources. According to some configurations, irrelevant subcategories are identified before generation of the KB 142 and/or the irrelevant subcategories may be removed from the KB 142 after generation of the KB 142.

At 540, a KG 124 can be generated from the KB 142. As discussed above, the KG 124 may be a flattened knowledge graph that includes the category directly connected to each of the different subcategories. In some examples, a user may specify changes to the KG. For instance, a user might add a connection, delete a connection, or edit a connection.

At 550, images are obtained for identified subcategories. As discussed above, one or more image sources 128 may be accessed by the KB service 116 to obtain representative images for each of the subcategories. As also discussed above, the image sources 128 may be structured data sources or unstructured data sources. In some examples, the image source that is accessed is the same as the data source 126 that is accessed.

At 560, images are removed that are not representative of the category. As discussed above, there may be some images that are not representative of particular category. In some examples, a user, such as a tester, may perform an initial inspection of the obtained images to remove any images that do not represent a specified subcategory.

At 570, the remaining images and the KB are used to train an image classifier 140. As discussed above, the images 112 associated with the KB 142 are used as the training data set to train an image classifier 140, such as a neural network. Instead of the training data set including many images that generally represent the category, the training data set includes images from each of the subcategories identified. As also discussed, the KB 142 may be used to assist in identifying when the image classifier 140 correctly identifies one or more objects within an image 112.

At 580, the trained image classifier is used to classify images received from users. As discussed above, the trained image classifier 140 that can be part of the image analysis service 120 may receive images 112 from user and type as images with the appropriate categories and subcategories. The routine 500 may then proceed to an end operation. Alternately, the routine 500 might proceed back to repeat some or all of the processing operations described above. For example, from 580, routine 500 may proceed back to 510.

FIG. 6 is a flow diagram showing a routine 600 illustrating aspects of a mechanism disclosed herein for identifying subcategories using structured and unstructured data sources. The routine 600 may begin at 610, where a structured data source is accessed. As discussed above, the data sources accessed 126 can depend upon the specified category. For example, many structured data sources 126A may be relevant to only one or a few categories.

At 620, the subcategories are identified from the data associated with the structured data source 126A. In some examples, the structured data source 126A may include a graph of notes that are connected based on the notes relevance to each other. In this case, the knowledge base manager 130 may follow the directed graph and record each word that is relevant to the specified category. The identified subcategories may then be stored in a memory of a computing device, or of a data store 127.

At 630, an unstructured data source 126B is accessed. In some examples, the unstructured data source 126B may be a website, results from a web search, a file containing data relevant to the category, and the like. In some configurations, the knowledge base manager 130 accesses web domains known to store content related to the specified category to obtain subcategory information. In other examples, the knowledge base manager 130 may perform a search using the specified category. For instance, the knowledge base manager 130 may perform a web search to locate data relevant to the specified category.

At 640, the subcategories are identified from the data associated with the unstructured data source 126B. In some examples, the unstructured data source 126B may be arranged such that the content can be programmatically parsed to identify the relationships between the category and the subcategories. For example, a web domain may include a first web page that relates to the category and other web pages (or links to other web pages) that identify the subcategories. In other examples, a user may select the subcategories from the data obtained from the unstructured data source 126B. The identified subcategories may then be stored in a memory of a computing device, or of a data store 127

At 650, the subcategories may be merged that are identified from the structured and unstructured data sources. As discussed above, some of the subcategories identified from the structured and unstructured data sources may include duplicate subcategories. In other examples, some of the subcategories identified from the structured and unstructured data sources may not be particularly relevant to the specified category. In some configurations, a user may perform all or a portion of the merging. In other configurations, the KB service 116 may perform all or a portion of the merging. For example, the KB service 116 may parse the identified subcategories, identify the duplicate subcategories, and remove the duplicate subcategories.

At 660, a decision is made as to whether to remove subcategory. As discussed above, one or more subcategories may be removed by a user and/or the KB service 116. When subcategory is to be removed process 600 may move to operation 670. When subcategory is not be removed the process may flow to an end operation.

At 670, the identified subcategories are removed. As discussed above, the subcategories removed may be duplicate subcategories and/or subcategories determined not to be relevant to the specified category. The routine 600 may then proceed to an end operation. Alternately, the routine 600 might proceed back to repeat some or all of the processing operations described above. For example, from 670, routine 600 may proceed back to 610.

Figure 7:
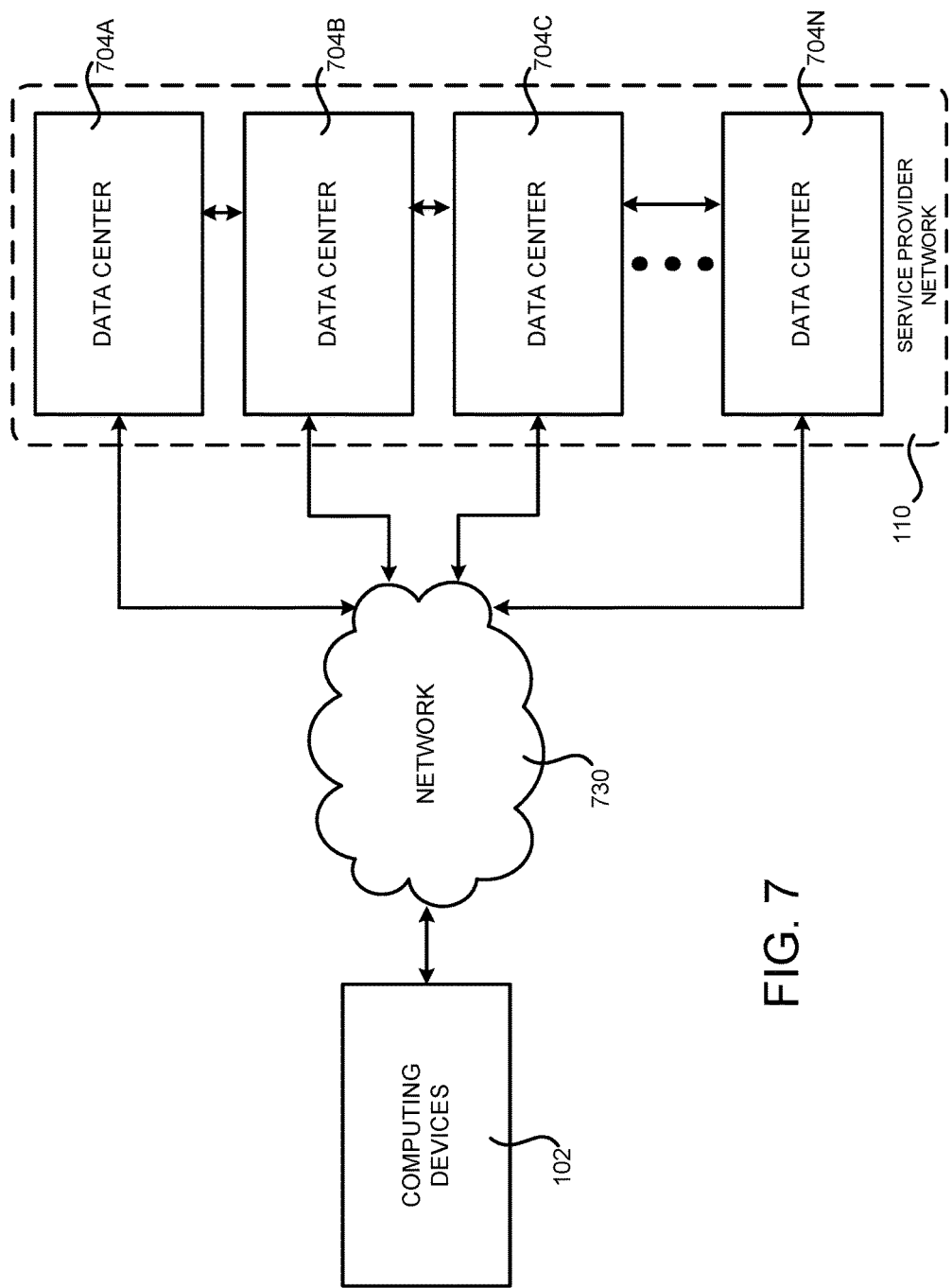
FIG. 7 is a system and network diagram that shows one illustrative operating environment for the examples disclosed herein that includes a service provider network.

FIG. 7 and the following description are intended to provide a brief, general description of a suitable computing environment in which the examples described herein may be implemented. In particular, FIG. 7 is a system and network diagram that shows an illustrative operating environment that includes a service provider network 104. As discussed above, the service provider network 104 can provide virtual machine instances and computing resources on a permanent or an as-needed basis.

The computing resources provided by the service provider network 104 may include various types of resources, such as data processing resources, data storage resources, networking resources, data communication resources and the like. Each type of computing resource may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 104 are enabled in one implementation by one or more data centers 704A-704N (which may be referred to herein singularly as "a data center 704" or collectively as "the data centers 704"). The data centers 704 are facilities utilized to house and operate computer systems and associated components. The data centers 704 typically include redundant and backup power, communications, cooling and security systems. The data centers 704 might also be located in geographically disparate locations. One illustrative configuration for a data center 704 that implements some or all of the concepts and technologies disclosed herein for annotating resources in the service provider network 104 will be described below with regard to FIG. 8.

The users and customers of the service provider network 104 may access the computing resources provided by the data centers 704 over a suitable data communications network, such as a Wide Area Network ("WAN"), as illustrated by network 730. Although a WAN might be used, it should be appreciated that a local-area network ("LAN"), the Internet, or any other networking topology known in the art that connects the data centers 704 to the computing devices 102 may be utilized. It should also be appreciated that combinations of such networks might also be utilized.

Figure 8:
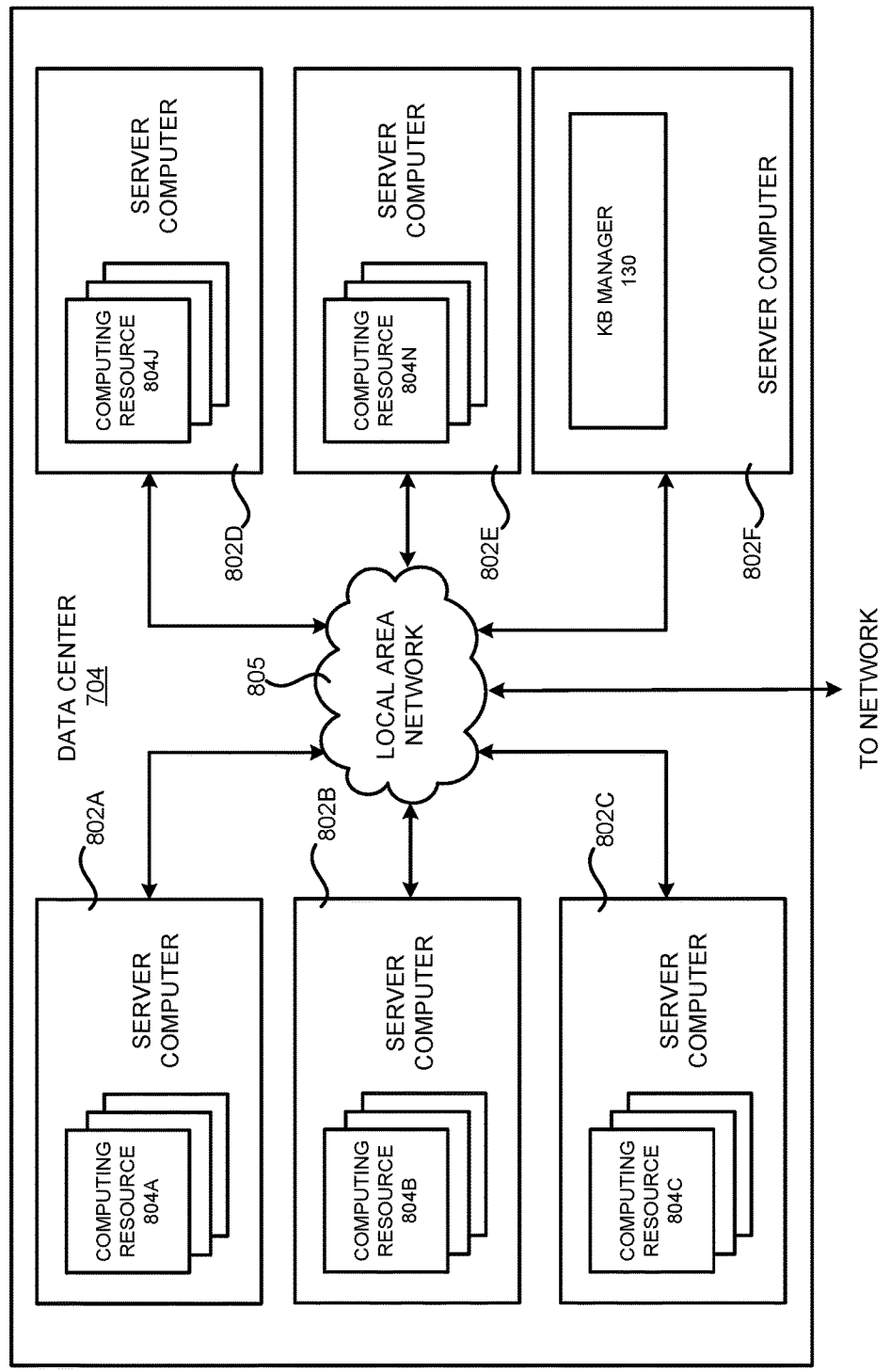
FIG. 8 is a computing system diagram that illustrates one configuration for a data center that implements aspects of a service provider network, including some or all of the concepts and technologies disclosed herein for generating and using a large-scale knowledge base.

FIG. 8 is a computing system diagram that illustrates one configuration for a data center 704 that implements aspects of a service provider network 104, including some or all of the concepts and technologies disclosed herein for generating and using a knowledge base for classifying images. The example data center 704 shown in FIG. 8 includes several server computers 802A-802F (which may be referred to herein singularly as "a server computer 802" or in the plural as "the server computers 802") for providing computing resources. The server computers 802 may be standard tower or rack-mount server computers configured appropriately for providing the computing resources described herein. According to an example, the server computers 802 are configured to execute the software products as described above.

In one example, some of the computing resources 804 are virtual machine instances. As known in the art, a virtual machine instance is an instance of a software implementation of a machine (i.e. a computer) that executes programs like a physical machine. Each of the server computers 802 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 802, for example.

The data center 704 shown in FIG. 8 also includes a server computer 802F reserved for executing software components for managing the operation of the data center 704, the server computers 802, virtual machine instances, and other resources within the service provider network 104. The server computer 802F might also execute the knowledge base manager 130. Details regarding the operation of each of these components has been provided above. In this regard, it should be appreciated that while these components are illustrated as executing within the service provider network 104, computing systems that are external to the service provider network 104 might also be utilized to execute some or all of these components. Other configurations might also be utilized.

In the example data center 704 shown in FIG. 8, an appropriate local area network ("LAN") 805 is utilized to interconnect the server computers 802A-802E and the server computer 802F. The LAN 805 is also connected to the network 730 illustrated in FIG. 7. It should be appreciated that the configuration and network topology illustrated in FIGS. 7 and 8 has been greatly simplified and that many more computing systems, networks and networking devices may be utilized to interconnect the various computing systems disclosed herein. Appropriate load balancing devices or software modules might also be utilized for balancing a load between each of the data centers 704A-704N, between each of the server computers 802A-802F in each data center 704 and between virtual machine instances and other types of computing resources provided by the service provider network 104.

It should be appreciated that the data center 704 described in FIG. 8 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 9:
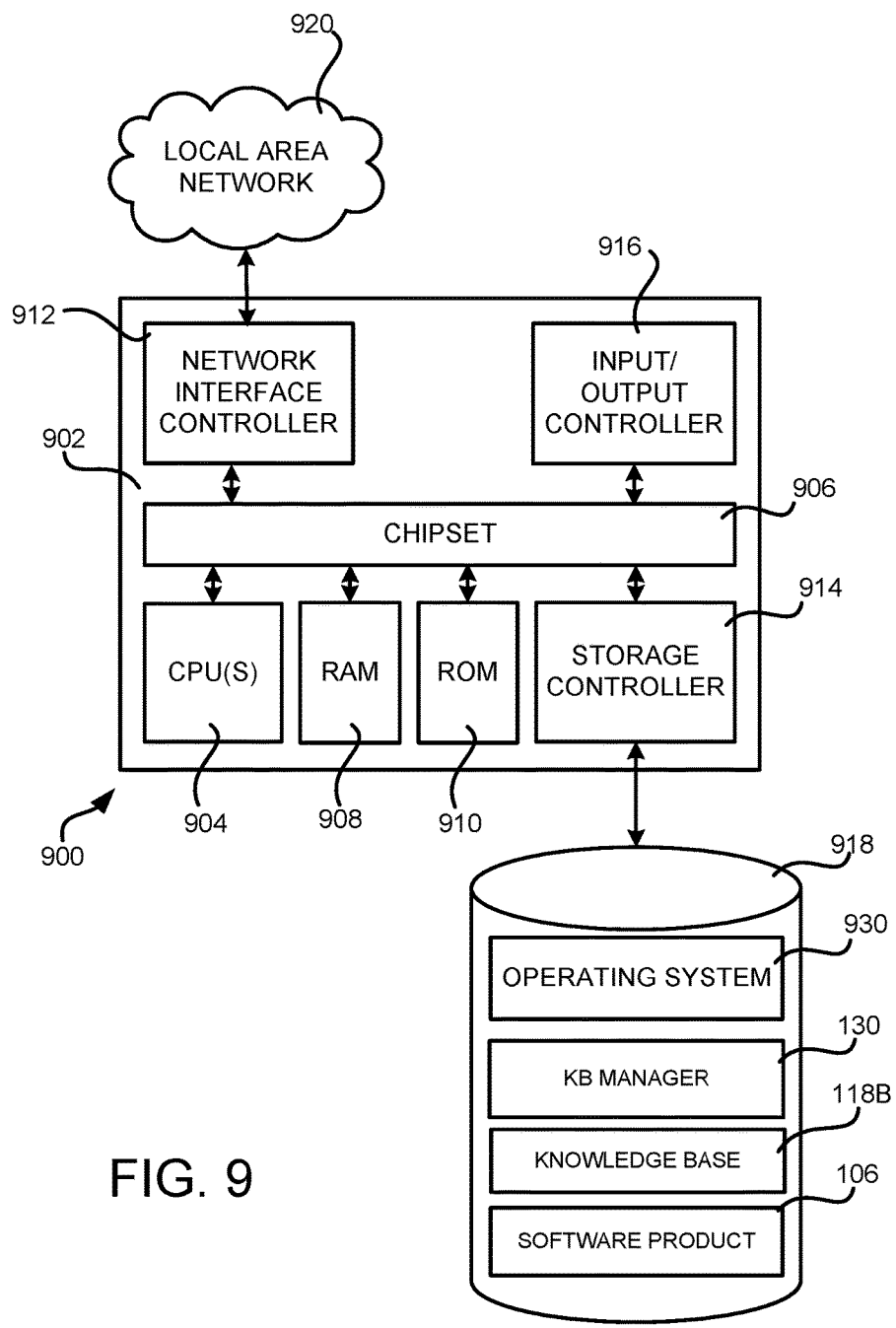
FIG. 9 is a computer architecture diagram showing one illustrative computer hardware architecture for implementing a computing device that might be utilized to implement aspects of the various examples presented herein.

FIG. 9 shows an example computer architecture for a computer 900 capable of executing program components for generating and using a large-scale knowledge base in the manner described above. The computer architecture shown in FIG. 9 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 9 may be utilized to execute software components for performing operations as described above. The computer architecture shown in FIG. 9 might also be utilized to implement a computing device 102 or any other of the computing systems described herein.

The computer 900 includes a baseboard 902, or "motherboard," which is a printed circuit board to which a multitude of components or devices may be connected by way of a system bus or other electrical communication paths. In one illustrative example, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 906 provides an interface between the CPUs 904 and the remainder of the components and devices on the baseboard 902. The chipset 906 may provide an interface to a RAM 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the examples described herein.

The computer 900 may operate in a networked environment using logical connections to remote computing devices and computer systems through a network, such as the local area network 920. The chipset 906 may include functionality for providing network connectivity through a network interface controller ("NIC") 912, such as a gigabit Ethernet adapter. The NIC 912 is capable of connecting the computer 900 to other computing devices over the local area network 920. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store system programs, application programs, other program modules and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 918 may store an operating system 930 utilized to control the operation of the computer 900. According to one example, the operating system comprises the LINUX operating system. According to another example, the operating system comprises the WINDOWS® SERVER operating system from MICROSOFT Corporation. According to further examples, the operating system may comprise the UNIX operating system. It should be appreciated that other operating systems may also be utilized. The mass storage device 918 may store other system or application programs and data utilized by the computer 900, such as components that include the knowledge base manager 130, the software product 106 and/or any of the other software components and data described above. The mass storage device 918 might also store other programs and data not specifically identified herein.

In one example, the mass storage device 918 or other computer-readable storage media is encoded with computer-executable instructions that, when loaded into the computer 900, transform the computer into a special-purpose computer capable of implementing the examples described herein. These computer-executable instructions transform the computer 900 by specifying how the CPUs 904 transition between states, as described above. According to one example, the computer 900 has access to computer-readable storage media storing computer-executable instructions which, when executed by the computer 900, perform the routines described above with regard to FIGS. 5-6. The computer 900 might also include computer-readable storage media for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, the input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for generating and using a large-scale knowledge base for image classification have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
receive, from a structured data source, first image data related to a specified category;
identify, by parsing the first image data, subcategories of the specified category;
generate a knowledge base (KB) that includes the subcategories of the specified category;
obtain, from an image source, digital images for individual ones of the subcategories specified by the KB;
train a neural network to classify images using the digital images and the KB;
receive an image; and
classify the image, using the neural network, as belonging to one or more of the specified category or subcategories of the specified category.

2. The non-transitory computer-readable storage medium of claim 1, wherein the computer-executable instructions further cause the computer to receive from an unstructured data source, second image data related to the specified category, and wherein identify the subcategories of the category is based at least in part on the first image data and the second image data.

3. The non-transitory computer-readable storage medium of claim 1, wherein the computer-executable instructions further cause the computer to generate a knowledge graph based, at least in part, on the KB, the knowledge graph including a parent node that represents the specified category, the parent node directly connected to children nodes that represent individual ones of the subcategories.

4. The non-transitory computer-readable storage medium of claim 1, wherein obtain digital images for individual ones of the subcategories comprises obtaining the digital images from publicly accessible web domains known to store content related to the specified category.

5. The non-transitory computer-readable storage medium of claim 1, wherein the computer-executable instructions further cause the computer to receive a user input indicating to remove at least a portion of the subcategories and remove the at least the portion of the subcategories.

6. The non-transitory computer-readable storage medium of claim 2, wherein the structured data source is a structured database and the unstructured data source is a website.

7. A system, comprising:
a data store;
one or more computing devices executing within a network and performing operations to:
access, from a data source of images external to the network, image data related to a specified category;
identify, based at least in part on the image data, subcategories of the specified category;
generate a knowledge base (KB) that includes individual ones of the subcategories;
store the KB in the data store;
obtain, from at least one of the data source of images external to the network or an alternative image source, digital images for the subcategories, the digital images identified based, at least in part, on the KB;
train an image classifier using the digital images and the KB;
receive an image; and
classify the image into a one of the subcategories using the image classifier.

8. The system of claim 7, wherein the data source of images external to the network comprises a structured data source and identify subcategories of the specified category is based on a structure of the structured data source.

9. The system of claim 7, wherein obtain digital images for the subcategories comprises obtaining the digital images from an unstructured data source external to the network.

10. The system of claim 7, wherein performing the operations further comprise to receive from a KB service an indication of one or more duplicate subcategories and remove the one or more duplicate subcategories.

11. The system of claim 7, wherein performing the operations further comprise to limit the image tags associated with a subcategory to a single definition of a word in the image tag.

12. The system of claim 7, wherein performing the operations further comprise to associate one or more tags with one of the digital images for the subcategories using the KB.

13. The system of claim 7, wherein performing the operations further comprise to generate a knowledge graph (KG) using data from KB, the KG defining connections between the specified category and individual ones of the subcategories.

14. The system of claim 13, wherein performing the operations further comprise to add a connection within the KG or remove a connection within the KG.

15. The system of claim 7, wherein the image classifier is a neural network and wherein train an image classifier further comprises identify an improperly identified image and adjust a weight of a node in the neural network by back-propagation training.

16. A computer-implemented method executing on one or more computing devices within a network, comprising:
accessing, from a data source of images external to the network, image data related to a specified category;
identifying, based at least in part on the image data, subcategories of the specified category;
generating a knowledge base (KB) that identifies individual ones of the subcategories;
obtaining, from at least one of the data source of images external to the network or an alternative image source, digital images for individual ones of the subcategories specified by the KB;
training an image classifier using the digital images and the KB;
receiving an image; and
classifying the image using the image classifier into one or more categories or subcategories.

17. The computer-implemented method of claim 16, wherein the data source of images external to the network is a structured data source and identify subcategories of the specified category is based on a structure of the structured data source.

18. The computer-implemented method of claim 16, wherein the alternative image source is a website external to the network.

19. The computer-implemented method of claim 16, further comprising identifying by a KB service one or more duplicate subcategories to remove.

20. The computer-implemented method of claim 16, further comprising associating one or more tags with one of the digital images using scene understanding or facial recognition.

* * * * *